(12) United States Patent
Sautter et al.

(10) Patent No.: US 8,235,267 B2
(45) Date of Patent: Aug. 7, 2012

(54) HITCH-MOUNTABLE BICYCLE CARRIER

(75) Inventors: Chris Sautter, Portland, OR (US);
Richard Jeli, Portland, OR (US);
Andrew Austin, Portland, OR (US);
Mike Kemery, Portland, OR (US); Zac Elder, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 1065 days.

(21) Appl. No.: 12/217,768

(22) Filed: Jul. 7, 2008

(65) Prior Publication Data
US 2009/0120984 A1    May 14, 2009

Related U.S. Application Data

(60) Provisional application No. 60/958,520, filed on Jul. 6, 2007.

(51) Int. Cl.
*B60R 9/10* (2006.01)

(52) U.S. Cl. ......... 224/497; 224/501; 224/521; 224/532
(58) Field of Classification Search .......... 224/502–509, 224/924, 537
See application file for complete search history.

(56) References Cited

U.S. PATENT DOCUMENTS

| | | | |
|---|---|---|---|
| 6,523,731 B1 * | 2/2003 | Pedrini .......................... | 224/537 |
| 6,968,986 B1 * | 11/2005 | Lloyd et al. ................... | 224/507 |
| 6,976,615 B2 * | 12/2005 | Dean ............................. | 224/405 |
| 2003/0164390 A1 * | 9/2003 | Higginbotham, III ........ | 224/519 |
| 2003/0222112 A1 * | 12/2003 | McLemore et al. .......... | 224/521 |
| 2004/0238582 A1 * | 12/2004 | Pedrini ......................... | 224/519 |
| 2005/0061842 A1 * | 3/2005 | Tsai .............................. | 224/501 |

* cited by examiner

*Primary Examiner* — Nathan J Newhouse
*Assistant Examiner* — Corey Skurdal
(74) *Attorney, Agent, or Firm* — Kolisch Hartwell, P.C.

(57) ABSTRACT

A bicycle rack for carrying bicycles behind a vehicle includes a tongue configured for connection to a vehicle hitch. A base portion includes wheel trays for supporting the wheels of a bicycle in cooperation with a slidable hook for contacting the top tube of a bicycle.

18 Claims, 5 Drawing Sheets

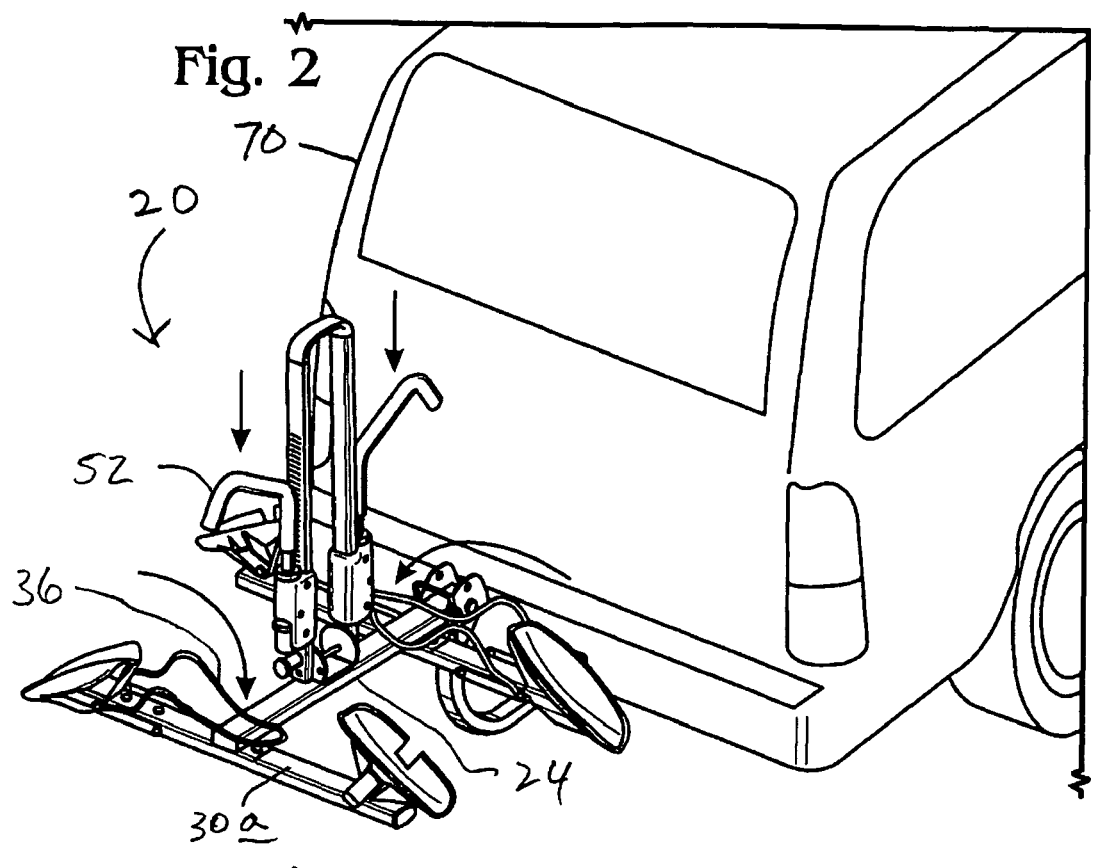
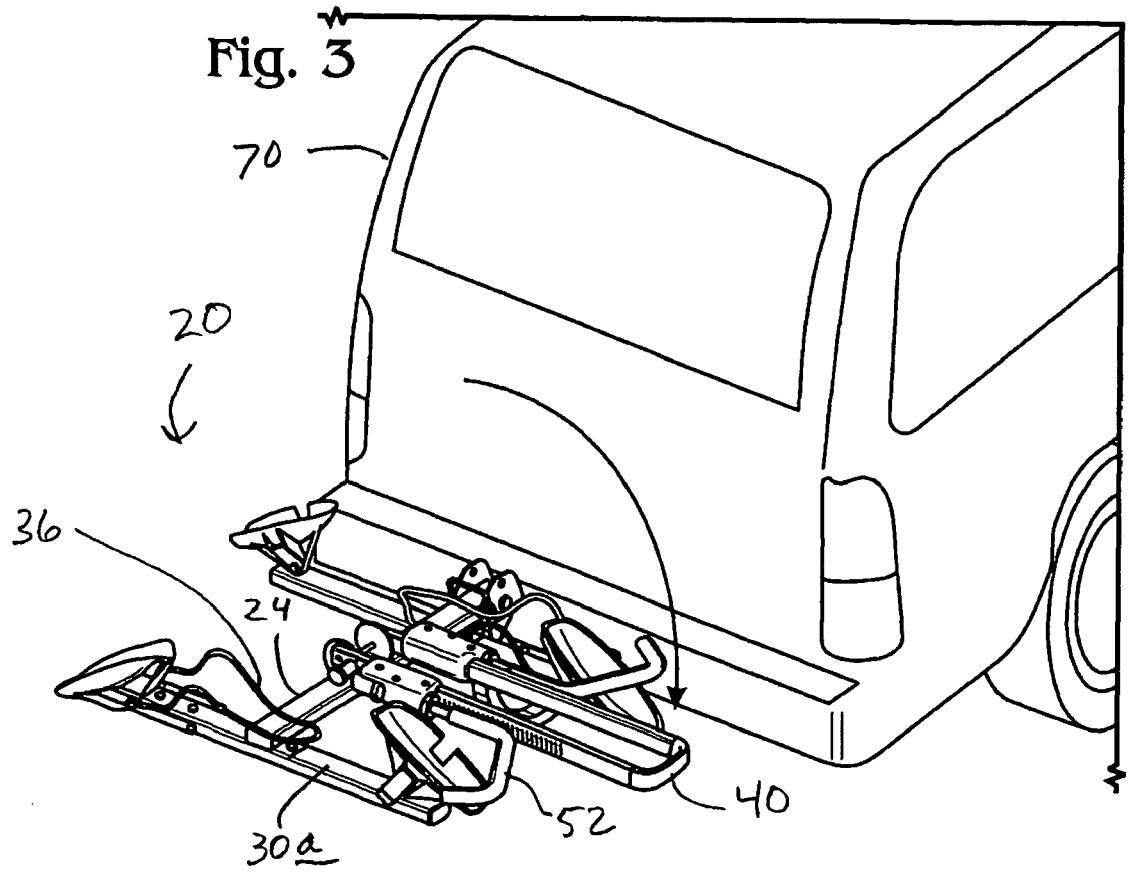

HITCH-MOUNTABLE BICYCLE CARRIER

CROSS-REFERENCE TO RELATED APPLICATIONS

This application claims priority under 35 U.S.C. §119(e) to U.S. Provisional Patent Application Ser. No. 60/958,520 filed on Jul. 6, 2007 and is entitled "Hitch Mounted Bicycle Racks for Vehicles." The complete disclosure of the above-identified patent application is hereby incorporated by reference for all purposes.

This application incorporates by reference in their entirety for all purposes the following U.S. Pat. Nos. 6,857,545, 6,761,297, 6,523,731, 6,439,397, 6,053,336, 6,019,266, 5,833,074, 5,692,659, 5,169,042, 5,029,740, 4,875,608, 4,823,997, 4,702,401, 4,524,893, 4,437,597, 4,403,716, 4,213,729, 4,171,077, 3,744,689, 1,179,823, 623,807, 614,264, 607,024, 586,681, 576,351, 556,789, 529,827 and 488,395.

FIELD OF THE INVENTION

This invention relates to racks for carrying bicycles, particularly racks configured for mounting in the hitch of a vehicle.

BACKGROUND

There are many different types of bicycle racks for securing bicycles to a variety of different vehicles. For example, there are racks for carrying bicycles on top of a car, behind a car, in the bed of a pick-up, on the front of a bus, etc. Many currently used bicycle racks are relatively large. They require large storage areas, and may be cumbersome to load and unload. There is a need for lighter, more compact racks that are easy and safe to use.

SUMMARY

A bicycle rack is configured for mounting to a hitch on the rear of a vehicle. An example of a hitch-mounted bicycle rack includes one or more wheel trays or wells mounted on a base, a front wheel hoop, and a frame support arm having an adjustable hook for contacting the top tube of a bicycle. The bicycle rack may be adapted for carrying multiple bicycles. Hooks for securing bicycle top tubes may be mounted on the same support arm and be independently adjustable. Hitch-mountable bicycle racks may be configured for efficient folding into a compact form behind the vehicle when the rack is not being used to carry bicycles.

DRAWINGS

FIGS. 2 and 3 are perspective views of the bicycle rack shown in FIG. 1, connected to the hitch of a vehicle.

DESCRIPTION

A rack for carrying bicycles behind a vehicle may use a single support which is configured for secure mounting in the hitch of a vehicle, a spine pivotally mounted on the support, and one or more bases mounted on the spine, each base being configured and equipped for carrying a bicycle. As shown in the figures, a base equipped with two short wheel trays on opposing ends of the base, with one tray pivoting or slidable along the base, and the other tray fixed or non-pivoting. A hoop is attached to the front wheel tray and may be foldable onto the tray, or over the tray toward the center of the base when not in use to minimize the collapsed form of the rack. The front wheel of a bicycle contacts the fixed front wheel tray and hoop in at least two points. The bicycle is held down by an indexing frame support arm contacting the top tube of the bicycle frame. A strap holds the rear tire down to the rear wheel tray. The distance between the front and rear wheel trays is less than the bicycle wheel base except for the smallest typical bicycle sizes.

Bicycle racks described below are collapsible into small package forms for shipping and storage, simply by folding the wheel trays, tongues, spines, of the racks. The clamping hooks rotate to clear the bicycle when loading or removing the bicycle. A button release mechanism on the arm of a hook is easily manipulated for collapsing the rack for storage and shipping. Racks are lightweight for ease of transport, and easy to install and remove. Racks use redundant parts which minimize tooling costs. Use of a pivoting rear wheel tray allows use of a short base to fit a wide range of bicycle sizes. Ratcheting wheel straps may be provided on the rear wheel tray for securely retaining the rear wheel of a bicycle.

Figure 1:
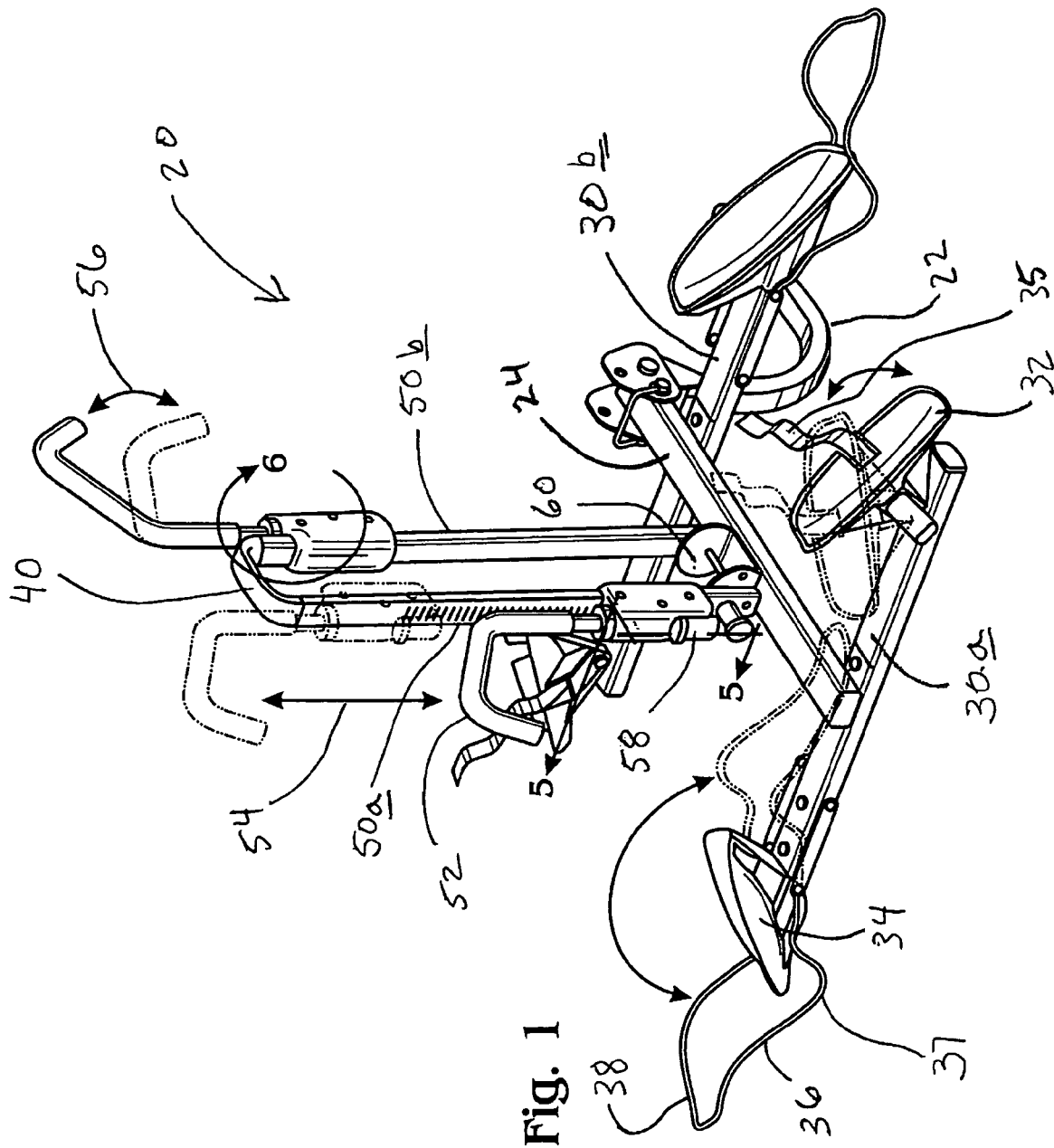
FIG. 1 is a perspective view of a bicycle rack configured for hitch mounting on the rear of a vehicle.

FIG. 1 shows an example of the invention providing a bicycle rack for mounting in a hitch on the rear of a vehicle. Tongue 22 is adapted at a proximal end (not shown) for mounting securely in a vehicle hitch. Spine 24 is pivotally mounted at a distal end of tongue 22. Spine 24 supports and is rigidly connected to base portions 30*a* and 30*b*. Base portions 30*a* and 30*b* are substantially perpendicular to spine 24, and parallel to each other. The rack's carrying capacity may be increased by increasing the length of spine 24 and the number of base portions connected to spine 24 in parallel.

The following description regarding base portions 30*a* and associated equipment, applies also to base portion 30*b*. Base portion 30*a* includes fixed wheel tray 34 and pivoting wheel tray 32 connected near opposite ends of base portion 30*a*. Fixed wheel tray 34 is intended to support the front wheel of a bicycle, while pivoting wheel tray 32 is configured to support the rear wheel of a bicycle. Strap 35 is provided for fastening a rear wheel to wheel tray 32. Hoop member 36 is rotatable between an extended position for carrying the front wheel of a bicycle, and a compact storage position (shown in dashed lines). Hoop 36 has a contour and/or design features which improve versatility and overall performance of rack 20. For example, downward curvature 37 may allow hoop 36 to conform around spine 24 when hoop 36 is folded up. A graduated V-shaped portion 38 of hoop 36 provides secure retention of bicycle tires and wheels of varying width.

Wheel trays or wells 34 and 32 are angled outward, configured to contact inside portions of front and back bicycle wheels respectively. This configuration allows the basic frame of the rack to be shorter, more compact, efficient, and economical compared to other bicycle racks. For example, a longitudinal axis of each wheel tray may form an angle with the base of approximately 45 degrees.

U-shaped support arm 40 is pivotally mounted on spine 24 between base portions 30a, 30b. Support arm 40 has two mast portions 50a, 50b. The following description of the equipment for mast portion 50a applies equally to masted portion 50b. Hook 52 is slidably mounted on mast portion 50a via a ratcheting system which permits one way downward movement of hook 52 simply by pushing on the top of hook 52. Hook 52 is movable up and down in the direction of arrow 54 for securing or releasing the top tube of a bicycle. Additionally, hook 52 is rotatable in the direction of arrow 56, as shown with respect to the hook on mast portion 50b. Release button 58 may be manipulated to permit hook 52 to move upward along mast portion 50a.

Figure 4:
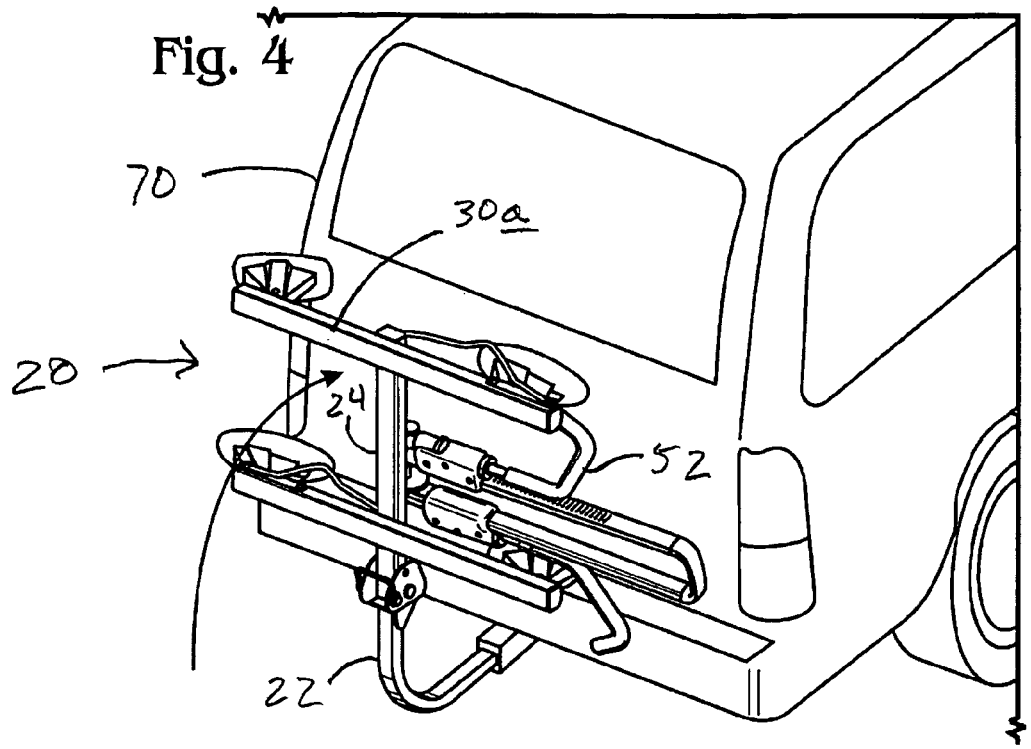
FIG. 4 is a perspective view of the bicycle rack shown in FIGS. 1-3, collapsed and folded up.

FIGS. 2-4 show how rack 20 may be collapsed and folded up toward the rear of vehicle 70. In FIG. 2, hoop 36 is folded inward toward spine 24. In FIG. 3, U-shaped support arm 40 is folded down to a horizontal position. In FIG. 4, spine 24 pivots up to a vertical position in line with the distal portion of tongue 22.

Figure 5:
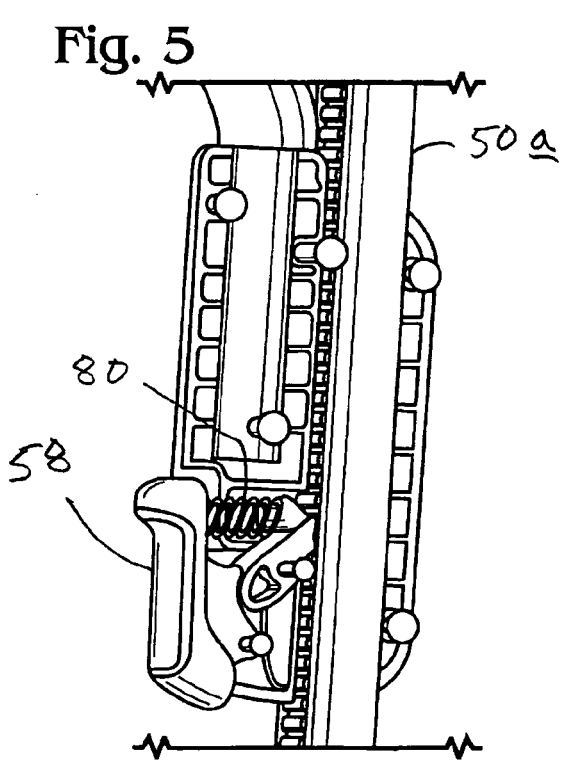
FIG. 5 is a partial cross-sectional view showing the hook release mechanism of the rack shown in FIGS. 1-4.

FIG. 5 shows a cross-sectional view through mast portion 50a illustrating a hook release mechanism activated by pressing button 58 against the force of spring 80. When button 58 is not pressed, spring 80 urges engagement with notches or grooves along mast portion 50a in a configuration which permits downward sliding, while preventing upward sliding without depression of button 58.

Figure 6:
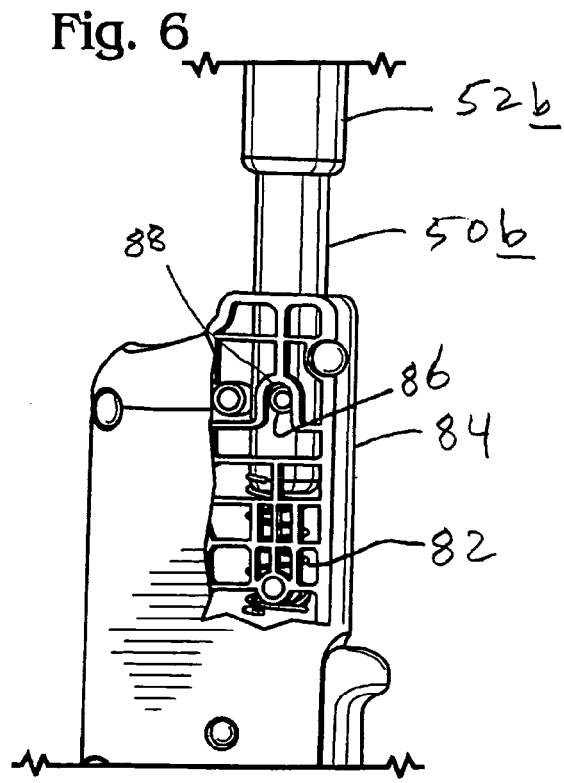
FIG. 6 is a partial cross-sectional view of a hook rotation device of the rack shown in FIGS. 1-4.

FIG. 6 shows a mechanism used to lock hook 52b in a use position, basically in a plane perpendicular to base portions 30a and 30b. Spring 82 biases mast portion 50b upward relative to housing 84. Peg or pin 86 is provided on mast portion 50b for fitting in slot 88 when hook 52b is in its use position for engaging a top tube of a bicycle. Alternatively, hook 52b may be rotated out of the use position toward or into a plane parallel with base portions 30a, 30b by pressing mast portion 50b downward, for example, about ½-inch, allowing peg 86 to escape slot 88 which frees hook 52b to rotate out of the use position. When it is desired to use the hook to engage a top tube of a bicycle, the hook is merely rotated toward the use position. When the hook becomes perpendicular to base portion 30b, then peg 86 moves upward into slot 88, thus locking the orientation of hook 52b in its use position.

When loading bicycles, the hooks may be rotated sideways to allow the bicycles to be easily loaded into the wheel trays without interference from the hooks. Then the hooks rotate back to hook over the top tube to retain the bicycle. To rotate the hook to loading position, the hook is pushed down, for example, about ½-inch and then rotated. Once the bicycle is loaded into the wheel trays, the hook can be rotated back to clamping position, simply by twisting the hook until it pops into an orientation where the hook is in a plane approximately perpendicular to the plane of the bicycle frame. At this point, the hook pops up about ½-inch and locks into the clamping orientation. The hook may then be ratcheted down into contact with the top tube of the bicycle simply by pushing the hook down.

Figure 7:
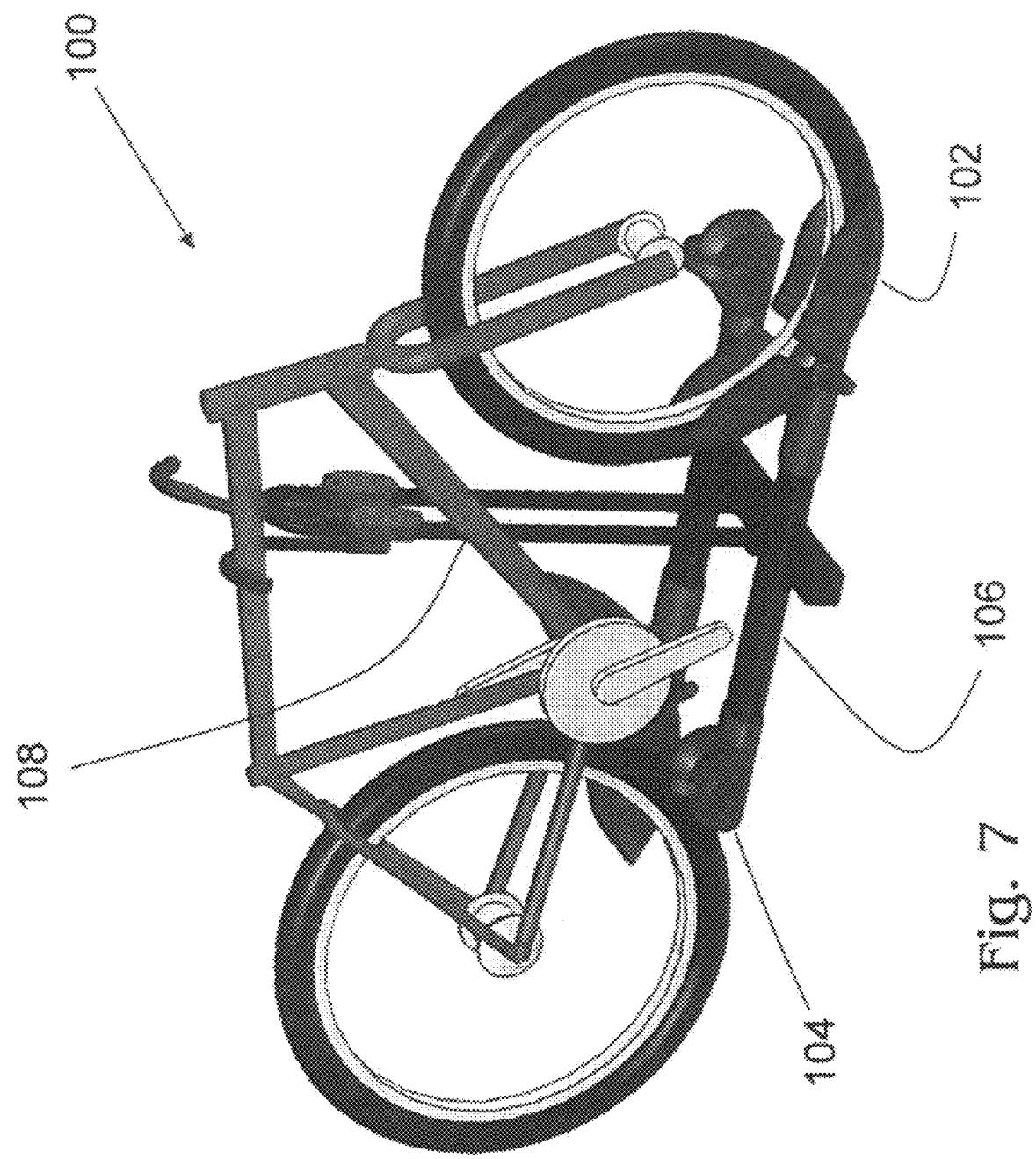
FIG. 7 is a perspective view of an alternative hitch-mountable bicycle rack embodiment.

FIG. 7 shows an alternative bicycle rack design similar to the design described above. However, the front wheel of the bicycle is carried by a large taco or wheel tray 102 along with a strap for supporting the front wheel of the bicycle. A roller 104 is provided at the opposite end of base portion 106 along with a strap for supporting the rear wheel of the bicycle. A central ratcheting hook and support arm is similar to the arm described above when engaging the top tube of the bicycle.

Figure 8:
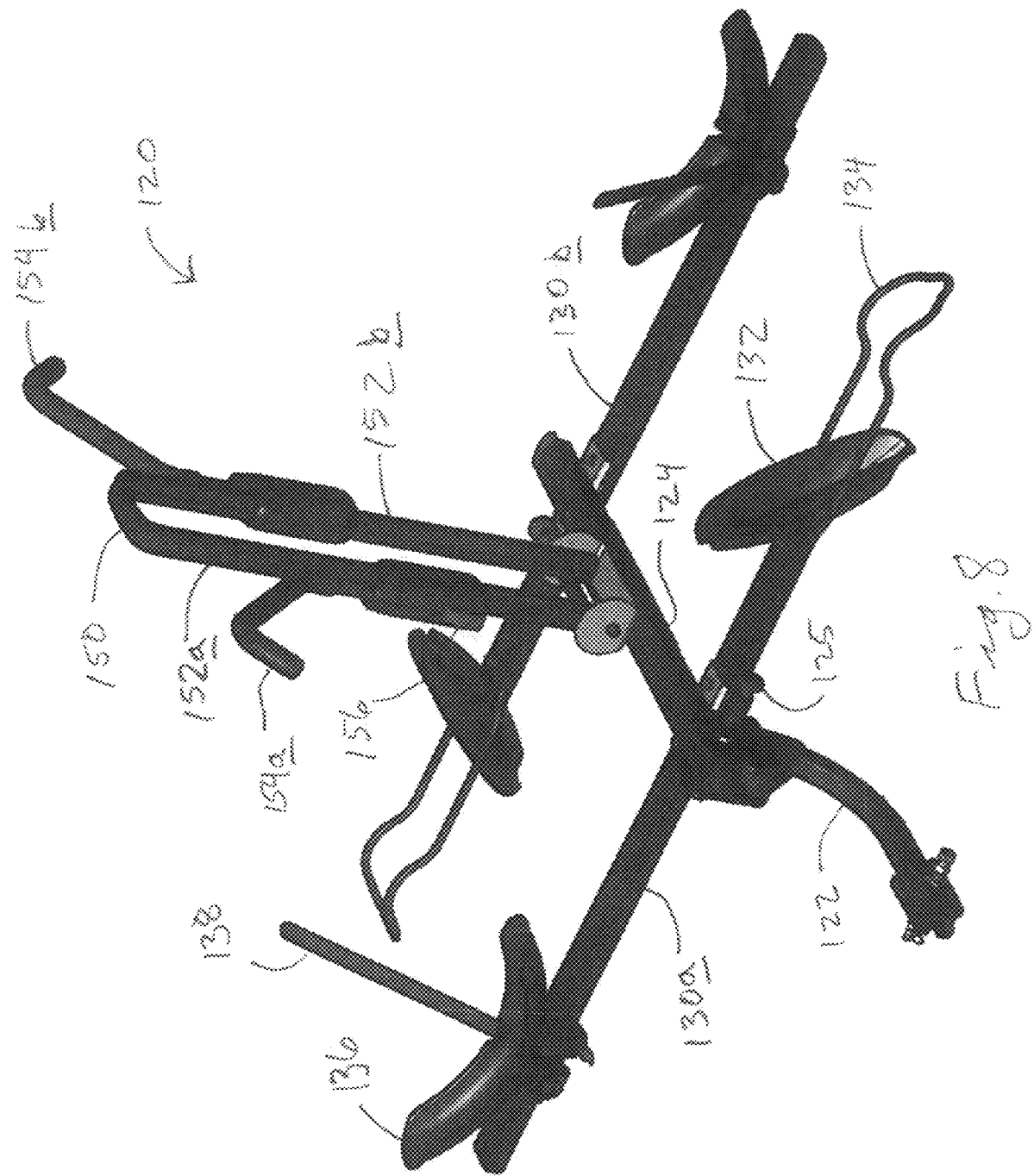
FIG. 8 is a perspective view of an alternative hitch-mountable bicycle rack embodiment.

FIG. 8 shows an alternative bicycle rack 120 adapted for mounting in the hitch behind a vehicle. Tongue 122 is configured for connecting the rack to a vehicle hitch. The tongue is curved upward to elevate the level of the rack relative to the hitch. Spine 124 is pivotally mounted on tongue 122. Spring-biased pin 125 is provided to lock and release the position of spine 124 relative to tongue 122, depending on whether the rack is in its use position or storage position. Base members 130a and 130b are rigidly connected to spine 124, perpendicular to spine 124, and parallel to each other. Each of base members 130a, 130b is equipped the same for supporting a bicycle. Base member 130a has front wheel tray 132 and curved hoop 134 for supporting the front wheel of the bicycle. Rear wheel tray 136 is provided near the opposite end of base member 130a along with strap 138 for securing the rear wheel of a bicycle. Rear wheel tray 136 may be slidable along base member 130a for accommodating bicycles of different sizes which typically have different spans between the wheels. U-shaped support arm 150 may be equipped essentially the same as the support arm shown and described with respect to FIGS. 1-6. Mast portions 152a and 152b support sliding hooks 154a and 154b. Hooks 154a may be ratcheted downward into contact with a top tube of a bicycle simply by pushing the hook downward. Button 156 is provided to allow release of the hook from a bicycle top tube by moving the hook upward along mast portion 152a.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. A carrier for a bicycle, comprising
   a tongue portion having a proximal end portion and a distal end portion, the proximal end portion being configured for connection to a vehicle hitch,
   a frame portion pivotally connected to the distal end portion of the tongue portion,
   a base connected to the frame portion, the base having opposing end portions, each end portion having a wheel well for supporting a bicycle wheel, and
   a mast structure pivotally mounted to the frame portion, configured for movement between an upright use position for securing a bicycle, and a horizontal collapsed position substantially parallel to the base, the mast structure being equipped with a slidable hook for engaging a top tube of a bicycle,
   wherein at least one of the wheel wells includes a hoop having an engagement region to engage a bicycle wheel,
   wherein the hoop is pivotal from an extended position for carrying a bicycle to a collapsed position in which the hoop is folded back toward the base and frame portion, and
   wherein a straight line extending from a top region of the at least one wheel well to the engagement region of the hoop slopes downward toward the engagement region when the hoop is in the extended position.

2. The carrier of claim 1, wherein at least one of the wheel wells is slidable along the base for accommodating different bicycle wheel spans.

3. The carrier of claim 1, wherein the mast structure is U-shaped for carrying two independently slidable hooks.

4. The carrier of claim 1, wherein the frame portion is pivotal between a horizontal use position and a collapsed position in which the frame portion is folded upward toward the rear of the vehicle.

5. The carrier of claim 1, wherein the hook is rotatable between a use position in a plane substantially perpendicular to the base, and a loading position in a plane substantially parallel to the base.

6. The carrier of claim 1, wherein the top region of the at least one wheel well is provided by a cup member having an inner surface that faces upward and an outer surface that faces downward, and wherein the inner surface is concave along and across the cup member.

7. The carrier of claim 1, wherein the hoop pivots one-half turn about a pivot axis when moved from the extended position to the collapsed position.

8. The carrier of claim 1, wherein the mast structure has a U-shaped body for carrying two independently slidable hooks each capable of sliding along the body.

9. A carrier for a bicycle, comprising
a tongue portion having a proximal end portion and a distal end portion, the proximal end portion being configured for connection to a vehicle hitch,
a frame portion pivotally connected to the distal end portion of the tongue portion,
a base connected to the frame portion, the base having opposing end portions, a first wheel well slidably connected to a first end portion of the base, and a second wheel well connected to the other end portion of the base, and
a mast structure pivotally mounted to the frame portion, configured for movement between an upright use position for securing a bicycle, and a horizontal collapsed position substantially parallel to the base, the mast structure being equipped with a slidable hook for engaging a top tube of a bicycle,
wherein at least one of the wheel wells includes a hoop that is pivotal one-half turn about a pivot axis to move the hoop from an extended position for supporting a bicycle wheel to a collapsed position in which the hoop is folded back toward the base and the frame portion, and
wherein the hoop has an engagement region to engage a wheel, and wherein a straight line extending from a top region of the at least one wheel well to the engagement region slopes downward toward the engagement region when the hoop is in the extended position.

10. The carrier of claim 9, wherein the mast structure has a U-shaped body for carrying two independently slidable hooks each capable of sliding along the body.

11. The carrier of claim 9, wherein the frame portion is pivotal between a horizontal use position and a collapsed position in which the frame portion is folded upward toward the rear of the vehicle.

12. The carrier of claim 9, wherein the top region is provided by a cup member, wherein the hoop defines an opening, and wherein the cup member is received in the opening when the at least one wheel well is moved from the extended position to the collapsed position.

13. A carrier for a bicycle, comprising
a tongue portion having a proximal end portion and a distal end portion, the proximal end portion being configured for connection to a vehicle hitch,
a frame portion pivotally connected to the distal end portion of the tongue portion, the frame portion being pivotal between a horizontal use position and a collapsed position in which the frame portion is folded upward toward the rear of the vehicle,
a base connected to the frame portion, the base having opposing end portions, each end portion having a wheel well for supporting a bicycle wheel, at least one of the wheel wells additionally having a hoop for securing a wheel, and
a mast structure pivotally mounted to the frame portion, configured for movement between an upright use position for securing a bicycle, and a horizontal collapsed position substantially parallel to the base, the mast structure being equipped with a first hook and a second hook for engaging a top tube of a bicycle,
wherein the mast structure includes a U-shaped body forming a pair of elongate members arranged parallel to one another, and wherein each hook is supported by and slidable along a different one of the elongate members.

14. The carrier of claim 13, wherein each hook is rotatable between a use position in a plane substantially perpendicular to the base, and a loading position in a plane substantially parallel to the base.

15. The carrier of claim 13, wherein the hoop is pivotal from an extended position for carrying a bicycle, and a collapsed position in which the hoop is folded back toward the base and frame portion.

16. The carrier of claim 13, wherein at least one of the wheel wells is slidable along the base for accommodating different bicycle wheel spans.

17. The carrier of 13, wherein the hoop has an engagement region to engage a bicycle wheel, wherein the at least one wheel well includes a cup member, wherein the hoop is pivotal from an extended position for carrying a bicycle to a collapsed position in which the hoop is folded back toward the base and frame portion, and wherein a straight line extending from a top region of the cup member to the engagement region of the hoop slopes downward toward such engagement region when the hoop is in the extended position.

18. The carrier of claim 13, wherein the hoop is pivotal one-half turn about a pivot axis to move the hoop from an extended position for supporting a bicycle wheel to a collapsed position in which the hoop is folded back toward the base and the frame portion.

* * * * *